(12) United States Patent
Bochen et al.

(10) Patent No.: US 7,900,530 B2
(45) Date of Patent: Mar. 8, 2011

(54) DRIVE DEVICE

(75) Inventors: Marian Bochen, Eitelborn (DE); Rolf Mintgen, Thuer (DE); Christian Schindlatz, Sinzig (DE); Oliver Schüttler, Monreal (DE)

(73) Assignee: Stabilus GmbH, Koblenz (DE)

( * ) Notice: Subject to any disclaimer, the term of this patent is extended or adjusted under 35 U.S.C. 154(b) by 748 days.

(21) Appl. No.: 11/899,864

(22) Filed: Sep. 7, 2007

(65) Prior Publication Data
US 2008/0061643 A1    Mar. 13, 2008

(30) Foreign Application Priority Data

Sep. 7, 2006  (DE) .......................... 10 2006 042 100

(51) Int. Cl.
*F16H 29/20*   (2006.01)
*E05F 11/24*   (2006.01)
(52) U.S. Cl. ............................... 74/89.23; 74/29; 49/343
(58) Field of Classification Search ............... 74/89.23, 74/89.29; 49/343; 318/111, 112, 113, 45, 318/46, 47, 48; 310/80, 112, 114
See application file for complete search history.

(56) References Cited

U.S. PATENT DOCUMENTS

| 4,761,588 | A | * | 8/1988 | Youcef-Toumi et al. | 318/46 |
| 4,962,963 | A | * | 10/1990 | Robinson | 297/362.11 |
| 5,715,729 | A | * | 2/1998 | Toyama et al. | 74/490.03 |
| 5,983,743 | A | * | 11/1999 | McGregor et al. | 74/89.23 |
| 6,240,678 | B1 | * | 6/2001 | Spether | 53/317 |
| 2005/0022453 | A1 | * | 2/2005 | Bosio | 49/343 |
| 2006/0081078 | A1 | * | 4/2006 | Nagai et al. | 74/89.23 |

FOREIGN PATENT DOCUMENTS

| DE | 76 38 512 | 5/1977 |
| DE | 10 2004 040 170 | 3/2006 |
| DE | 20 2005 003 466 U1 | 7/2006 |
| DE | 20 2005 007 154 | 9/2006 |
| DE | 20 2005 007 155 | 9/2006 |
| DE | 10 2005 030 052 | 12/2006 |

* cited by examiner

*Primary Examiner* — Thomas R Hannon
*Assistant Examiner* — Phillip A Johnson
(74) *Attorney, Agent, or Firm* — Cohen Pontani Lieberman & Pavane LLP

(57) ABSTRACT

A drive device for a hatch of a motor vehicle, wherein a spindle drive is provided with a threaded spindle and a spindle nut mounted on the threaded spindle, by which drive the first fastening element and the housing tube can be driven axially relative to each other. The spindle drive can be rotatably driven by an electric motor, where the output shaft of the motor can rotate the threaded spindle or a connecting component of a clutch. The spindle drive can be rotatably driven by two or more series-connected electric motors.

21 Claims, 1 Drawing Sheet

DRIVE DEVICE

BACKGROUND OF THE INVENTION

1. Field of the Invention

The present invention generally relates to the field of door openers and, more particularly, to a drive device for a hatch of a motor vehicle.

2. Description of the Related Art

Conventional drive devices for the hatch of a motor vehicle typically include a first fastening element that can be connected to a stationary component or to a movable component and a housing tube that is located at an end of the drive device opposite to the first fastening element. The housing tube is able to move axially relative to the first fastening element and has a second fastening element on the end opposite the first fastening element, where it is possible to connect this second element to the movable component or to the stationary component.

The drive device also includes a spindle drive that comprises a threaded spindle and a spindle nut that is mounted on the threaded spindle. The spindle drive permits the first fastening element and the housing tube to be driven axially relative to each other. In addition, the spindle drive can be rotatably driven by an electric motor, where the output shaft of the motor can rotate the threaded spindle or a connecting component of a clutch.

In such conventional drive devices, it is known that the electric motor can be produced as a completely independent unit having its own motor housing, which is then installed in the housing tube. However, this requires not only a large number of components but also a great deal of care in the installation of the electric motor to ensure that it is coaxial to the threaded spindle or to the clutch provided in the housing tube.

In drive devices of this type, the electric motor must be designed such that it can reliably move a component to be moved under any normal operating conditions. In the case of movable components which are relatively heavy, a correspondingly powerful electric motor must be used, the size of which will also be considerable, especially with respect to its diameter. This leads to a drive device which requires a large amount of installation space.

It is therefore apparent there is need for a drive device of the above-indicated type which is small in size and which especially has a small diameter.

SUMMARY OF THE INVENTION

This and other objects and advantages are achieved in the present invention by providing a spindle drive that can be rotatably driven by two or more series-connected electric motors.

The overall power of the electric drive of the drive device is distributed over a plurality of electric motors. As a result, these motors can have lower power ratings and the electric motors will have smaller diameters. Thus, the area of the drive device in which the electric motors are installed can have a correspondingly small outside diameter. In addition, the additional components of the drive device can be easily provided with a small outside diameter, and the outside diameter of the drive unit is determined by the outside diameter of the motor area. As a result, the overall outside diameter of the drive device will be small.

Generally, the electric motors are installed at the outside of the housing tube. However, in accordance with the present invention, if the electric motors are located in the housing tube, then the drive device forms a compact structural unit, and the housing tube will simultaneously form a positioning receptacle and protective sleeve for the electric motors.

The motor shafts of the electric motors are preferably connected non-rotatably to each other by motor shaft couplings. In certain embodiments of the invention, the motor shaft couplings comprise compression couplings. Here, it becomes especially easy to add the power of one electric motor to that of the other, and it also becomes possible to compensate for any slight offset between the axes of the individual motor shafts.

In accordance with the contemplated embodiments, the electric motors are brush motors or electronically commutated motors. However, it should be readily appreciated that other types of motors may be used, and it is not the intention to be limited to only brush or electronically commutated motors.

The threaded spindle can be supported rotatably at one end on the housing tube, whereas it is held stationary in the axial direction with respect to the housing tube and can be rotatably driven by the electric motor; the spindle nut connected to the first fastening element can be locked against rotation with respect to the housing tube. As a result, the torque of the spindle nut is absorbed within the drive device and does not have to be supported via the fastening elements on the movable component and the stationary component. Such a configuration makes it possible to mount the drive device in any desired orientation on the movable component and the stationary component. As a result, it becomes considerably easier to install the drive device.

The housing tube can be manufactured simply and easily by deep-drawing a metal part, for example, or by injection-molding a part out of plastic. In addition, the spindle nut can be easily connected to one end of a spindle tube coaxially surrounding the threaded spindle, where the first fastening element is permanently connected to the other end of the spindle tube. Moreover, the spindle tube can also be a metal part produced by a forming method such as deep-drawing, or it can be a plastic part produced by injection-molding.

In other embodiments of the drive device, it is possible to install a gearbox between the electric motor and the spindle drive to reduce the rotational speed and thus to increase the torque. If the gearbox consists of a cylindrical gear system and/or a planetary gear set, very little noise will be generated, and this can be reduced even more if the stages of the gearbox near the rotary drive are configured as helical gear stages.

If one or both of the fastening elements are configured as the ball heads or as the spherical sockets of ball joints, an embodiment is obtained which can be easily mounted in any desired rotational position with respect to the longitudinal axis of the drive device.

Generally, the series arrangement of the electric motors in accordance with the invention can produce high actuating forces, even though the diameter of the drive device is small. As a result, a supplemental actuating force is not required.

It is also possible, however, in addition to the actuating forces of the electric motors, for the first fastening element to be actuated or actuatable by the force of a spring in the outward-travel direction, away from the housing tube, thereby supporting the force exerted by the driver device and, thus, balancing the weight of the hatch. This support can extend over the entire adjustment stroke or over only a part of the stroke.

In accordance with the contemplated embodiment of the drive device, the first fastening element is actuated to obtain the adjustment by a compression spring, in particular a helical compression spring, which is supported on the housing tube.

Alternatively or in addition, the first fastening element can also be actuated by the gas pressure.

The force which is required to move the spindle manually is preferably selected precisely so that the hatch can be held in intermediate positions when the rotary drive is turned off or deactivated. Thus, in the case of a rotary drive in the form of an electric motor, a current-less stop position can be easily achieved.

To disconnect the electric motor from the spindle drive, the electric motor that rotatably drives the spindle drive can be actuated by a releasable clutch, which can be a positive clutch or a friction clutch.

In alternative embodiments, the clutch is provided with an engaging and disengaging function so that the clutch can be opened and closed. In particular, the clutch engages and disengages magnetically.

In other embodiments of the drive device, a separate clutch drive is omitted. Here, the clutch is configured such that it is open when the drive device is in the no-load state or is loaded in the outward-travel direction and is closed by exerting force on the drive device in the inward-travel direction. As a result, the hatch is allowed to be moved by hand with the exertion of only modest manual forces in the pulling direction of the drive device, because the electric motor and possibly the gearbox cannot exert any inhibiting forces on the spindle. In accordance with the contemplated embodiment, it becomes possible to detect obstacles and to eliminate them in an optimal manner when the hatch is being closed because no tractive forces can be transmitted.

The means for balancing the weight of the hatch are preferably configured such that a resultant moment is always acting in the closing direction. Consequently, the drive device is required to always be able to open the hatch in a motorized manner. It thus becomes necessary only to let the hatch down at a defined speed to close it using the device of the contemplated embodiments.

In yet another embodiment, a guide tube which surrounds the spindle tube, leaving a predefined gap, can be mounted on the housing tube. Here, if the helical compression spring surrounds the guide tube, creating a predefined gap, and is also surrounded by a jacket tube connected to the first fastening element, at another predefined gap, then the helical compression spring is both guided and protected radially both toward the outside and toward the inside of the device.

In each of the contemplated embodiments of the invention, it is possible to protect the components of the drive device from dirt and damage by configuring the housing tube and the jacket tube so that they can telescope into and out of each other.

In other embodiments, the threaded spindle is a multi-thread spindle preferably with a lead in the range of about 10-24 mm so that the device can be operated easily and efficiently by hand.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The various features, functions and advantages characterizing the invention will be better understood by reference to the detailed description which follows, taken in conjunction with the accompanying drawing. It should be understood that the drawing is not necessarily drawn to scale and that, unless otherwise indicated, it is merely intended to conceptually illustrate the structures and procedures described herein.

The single FIGURE shows a cross section of a drive device in accordance with the invention.

DETAILED DESCRIPTION OF THE PRESENTLY PREFERRED EMBODIMENTS

Figure 1:
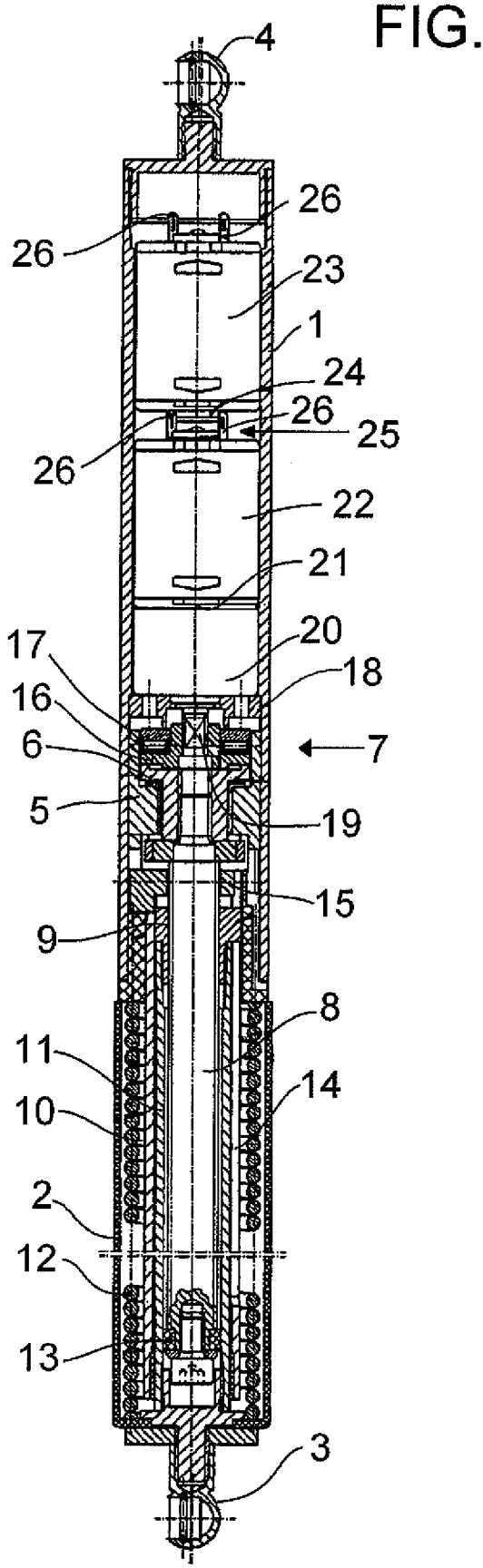

With reference to the FIGURE, the device shown therein has a housing tube 1 made of a conductive material, such as steel, on which a jacket tube 2 is guided in a telescoping manner.

A first ball socket 3 is provided on an end of the jacket tube 2 opposite the housing tube 1, and a second ball socket 4 is provided on the end of the housing tube 1 opposite the jacket tube 2. These sockets 2, 4 make it possible to hinge the drive device to a stationary body component of a motor vehicle and to a movable component of the motor vehicle, such as a hatch of the vehicle.

A first bearing part 5 is permanently inserted in the end area of the housing tube 1 facing the jacket tube 2, in which a first clutch part 6 of a friction clutch 7 is rotatably supported. The clutch part is seated firmly on one end of a threaded spindle 8 projecting into the jacket tube 2.

A spindle nut 9 is threaded onto the threaded spindle 8 but is mounted non-rotatably with respect to the housing tube 1. The spindle nut 9 is connected to one end of a spindle tube 11, which coaxially surrounds the threaded spindle 8. The first ball socket 3 is permanently mounted on the other end of the spindle tube. Here, the spindle nut 9 is guided with a relative degree of freedom to slide axially in a guide tube 10 surrounding the spindle tube 11, where the guide tube is permanently connected to the housing tube 1.

A helical compression spring 12 is provided in the annular gap between the guide tube 10 and the jacket tube 2 surrounding it with a predefined gap. One end of the helical compression spring 12 is supported on the jacket tube 2 in the area of the first ball socket 3, the other end being supported on the housing tube 1.

At the end facing away from the first clutch part 6, the threaded spindle 8 carries a guide sleeve 13. Here, the cylindrical lateral surface of this sleeve guides the threaded spindle 8 with a freedom of axial movement in the spindle tube 11.

The guide tube 10 includes axial slots 14, which are distributed uniformly around the circumference of the tube and which extend over almost all or substantially its entire length. In the preferred embodiment, the guide tube has three axial slots.

Radially projecting support pins 15, which correspond to the axial slots 14, are arranged on the spindle nut 9. These pins project into the axial slots 14 and, thus, prevent the spindle nut 9 from turning with respect to the guide tube 10.

A second clutch part 16 is installed in the housing tube 1 at a position coaxially opposite the first clutch part 6. In certain embodiments, a ring-shaped friction lining is provided between the two clutch parts 6 and 16.

The side of the second clutch part 16 facing away from the first clutch part 6 is supported axially by an axial bearing 17 on an abutment part 18, which is permanently mounted in the housing tube 1.

In accordance with contemplated embodiments of the invention, the first clutch part 6 and the second clutch part 16 have a certain amount of play between them, so that they can move axially away from each other to break the frictional connection between them.

A takeoff shaft 19 of a gearbox 20 is connected coaxially and non-rotatably to the second clutch part 16. As a result, the gearbox 20 can be rotatably driven by the motor shaft 21 of a first electric motor 22. The first electric motor 22 is mounted nonrotatably in the housing tube 1. In the preferred embodiment, the gearbox 20 is a multi-stage gearbox.

On the side of the first electric motor 22 that faces away from the gearbox 20, a second electric motor 23 is also installed coaxially and non-rotatably in the housing tube 1. The motor shaft 24 of the second electric motor 23 is connected non-rotatably to the motor shaft 21 of the first electric motor 23 by a compression coupling 25, so that the power of the two individual electric motors 22 and 23 are added to each other. The first electric motor 22 and the second electric motor 23 are also provided with terminal contacts 26 so that the motors can be provided with electric current.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive device for a hatch of a motor vehicle, comprising:
    a first fastening element, which is connectable to a stationary component or a movable component;
    a housing tube of conductive material, said housing tube being located at an end of the device opposite the first fastening element and axially moveable relative to the first fastening element, said housing tube including a second fastening element located at an end opposite to the first fastening element, said second fastening element being connectable to the movable component or to the stationary component;
    a spindle drive comprising a threaded spindle and a spindle nut mounted on the threaded spindle, said spindle drive being actuatable to axially move the first fastening element relative to the housing tube,
    wherein one end of the threaded spindle is rotatably supported on the housing tube, is mounted in a fixed axial position with respect to the housing tube, and is rotatably driveable by the electric motor; and wherein the spindle nut, which is connected to the first fastening element, is prevented from rotating with respect to the housing tube and the spindle nut is connected to one end of a spindle tube coaxially surrounding the threaded spindle, the first fastening element being permanently mounted on the other end of the spindle tube;
    a plurality of series-connected electric motors to rotatably drive the spindle drive, an output shaft of said plural series-connected electric motors being configured to rotate the threaded spindle or a connecting component of a clutch; and
    a guide tube mounted in the housing tube, said guide tube surrounding the spindle tube and forming a predefined gap between the guide tube and the spindle tube,
    wherein the first fastening element is actuated by a compression spring supported on the housing tube, and wherein the compression spring embodied as an helical compression spring surrounds the guide tube and forms a predefined gap between the helical compression spring and the guide tube, said helical compression spring being surrounded by a jacket tube with another predefined gap between the helical compression spring and the jacket tube which is connected to the first fastening element.

2. The drive device according to claim 1, wherein each of said plural series-connected electric motors are installed in the housing tube.

3. The drive device according to claim 1, wherein motor shafts of each of the plural electric motors are connected non-rotatably to each other by at least one motor shaft coupling.

4. The drive device according to claim 3, wherein the motor shaft coupling is a compression coupling.

5. The drive device according to claim 1, wherein each of the plural electric motors are brush motors.

6. The drive device according to one of claim 1, wherein each of the electric motors are electronically commutated motors.

7. The drive device according to claim 1, wherein the spindle drive is rotatably drivable by each of the plural series-connected electric motors through a gearbox.

8. The drive device according to claim 7, wherein stages of the gearbox close to the plural series-connected electric motors are configured as helical gear stages.

9. The drive device according to claim 1, wherein at least one of the fastening elements comprise ball heads or ball sockets of ball joints.

10. The drive device according to claim 1, wherein the spindle drive is rotatably driveable by each of said plural electric motors through a releasable clutch.

11. The drive device according to claim 10, wherein the clutch is a positive clutch or a friction clutch.

12. The drive device according to claim 10, wherein the clutch is openable and closeable.

13. The drive device according to one of claim 10, wherein the clutch is open when the drive device is not under load or is under load in an outward travel direction and is closeable when the drive device is under load in an inward travel direction.

14. The drive device according to claim 10, wherein the clutch is openable and closeable.

15. The drive device according to claim 10, wherein the clutch is magnetically engageable and disengageable.

16. The drive device according to claim 10, wherein the clutch is open when the drive device is not under load or is under load in an outward travel direction and is closeable when the drive device is under load in an inward travel direction.

17. The drive device according to claim 1, wherein the housing tube and the jacket tube inwardly and outwardly slideably engage each other in a telescoping manner.

18. The drive device according to claim 1, wherein the threaded spindle is a multi-thread spindle.

19. The drive device according to claim 1, wherein the threaded spindle has a lead of substantially 10-24 mm.

20. The drive device according to claim 19, wherein the clutch is magnetically engageable and disengageable.

21. The drive device of claim 1, wherein the compression spring comprises a helical compression spring.

* * * * *